Figure 1:
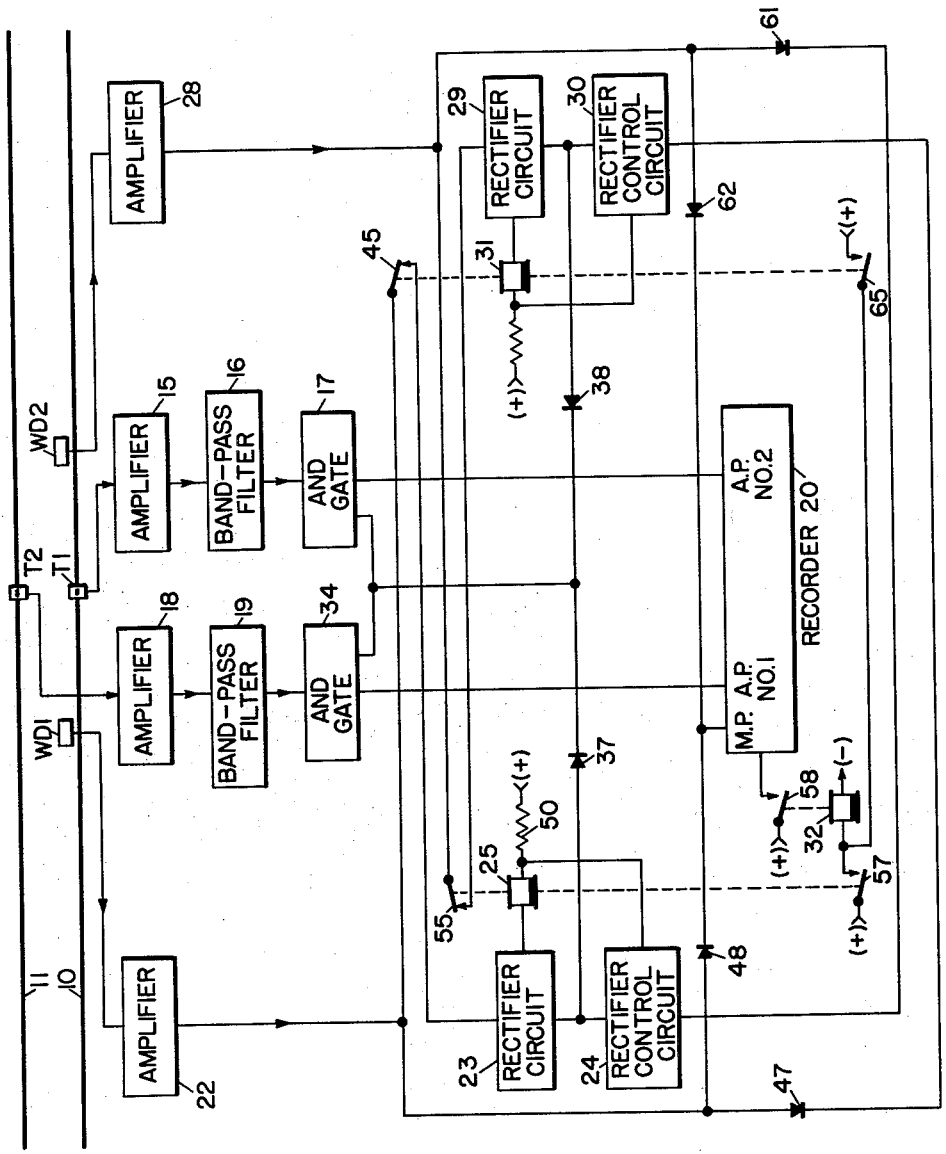

Dec. 29, 1964  D. R. McCAULEY  3,163,384
DETECTION MEANS FOR IMPROPERLY LUBRICATED JOURNALS
Filed Oct. 20, 1960  3 Sheets-Sheet 1

FIG. I.

INVENTOR.
D.R. MC.CAULEY
BY
Forest D. Hitchcock
HIS ATTORNEY

Dec. 29, 1964   D. R. McCAULEY   3,163,384
DETECTION MEANS FOR IMPROPERLY LUBRICATED JOURNALS
Filed Oct. 20, 1960   3 Sheets-Sheet 2

INVENTOR.
D. R. MC.CAULEY
BY
HIS ATTORNEY

United States Patent Office 3,163,384
Patented Dec. 29, 1964

3,163,384
DETECTION MEANS FOR IMPROPERLY
LUBRICATED JOURNALS
Donald R. McCauley, Rochester, N.Y., assignor to
General Signal Corporation
Filed Oct. 20, 1960, Ser. No. 63,880
1 Claim. (Cl. 246—169)

This invention relates to means for detecting an improperly lubricated journal, and, more particularly, pertains to means for detecting different conditions of journal operation on moving railway cars as they pass a fixed detecting location.

The problem of detecting improperly lubricated journals is well recognized in the prior art as evidenced by the various attempts to reconcile this problem. For the most part, these attempts rely upon the detection of the heat that is generated by such a journal. One of the first attempts was to employ car-carried apparatus comprising fusible elements which melt at predetermined journal temperatures and act to give an indication to an observer or act directly to apply the brakes of the train automatically. In order to overcome the disadvantages inherent with this attempt, i.e., for example, the prohibitive cost of installation and maintenance, other attempts employing fixed wayside equipment which is sensitive to the radiation of infrared electromagnetic energy from a hot bearing and emanating from, for example, the journal box in order to give an indication of the journal condition as each wheel passes the equipment location were made which have since experienced some measurable success in operation.

In relying upon the heat emanating from a journal, only the fact that the heat is at a normal temperature or above the normal temperature is effectively established. The causation of above normal temperatures is generally assumed to be indicative of an improperly lubricated journal resulting from an insufficient supply of oil. It has been the experience that journals having above normal temperatures may effectively have had temperatures raised by something other than improper lubrication. That is, it may be the case resulting from waste material which has has effectively wedged itself between the bearing and journal surfaces even though a proper quantity of lubrication is present and then causes the lubrication to be ineffective.

In the present invention, it is contemplated to employ an entirely different phenomenon associated with an improperly lubricated journal and other different conditions of journal operation for effectively detecting the separate conditions under which a journal is operated. More particularly, it is proposed in this invention to provide detecting means at a definite location along the track rail and affixed thereto comprising a transducer which will be responsive to vibrations established in the rail by improper lubrication as well as other conditions of journal operation and characteristic thereof. The distinctive, high-frequency vibrations emanating from a journal and established in the associated rail are converted by the transducer to corresponding electrical signals which are then amplified and the resulting output, distinctive by its frequency and amplitude, is applied to electronic circuits that will record the different conditions associated with the journal only provided the corresponding wheel is within a demarcated area. Morevore, wheel counting means is provided so that an additional record is made as to the location on the moving train of each condition of journal operation which may or may not require immediate attention.

One object of this invention is to provide a detecting system and a wheel responsive system arranged in a relationship such that the detecting system is provided responsive to vibrations of certain frequencies only during the interval that the wheel responsive system is actuated by a passing wheel.

Another object of this invention is to provide a circuit means operative in responsive to the direction of train travel for controlling the gating operation of the detecting system for each passing wheel.

Another object of this invention is to provide a detecting system having means responsive to several conditions of journal operation to effect the presentation of indications respective of the different conditions to be presented.

Other objects, purposes and characteristic features of the present invention will be in part obvious from the accompanying drawings, and in part pointed out as the description of the invention progresses.

Figure 2:
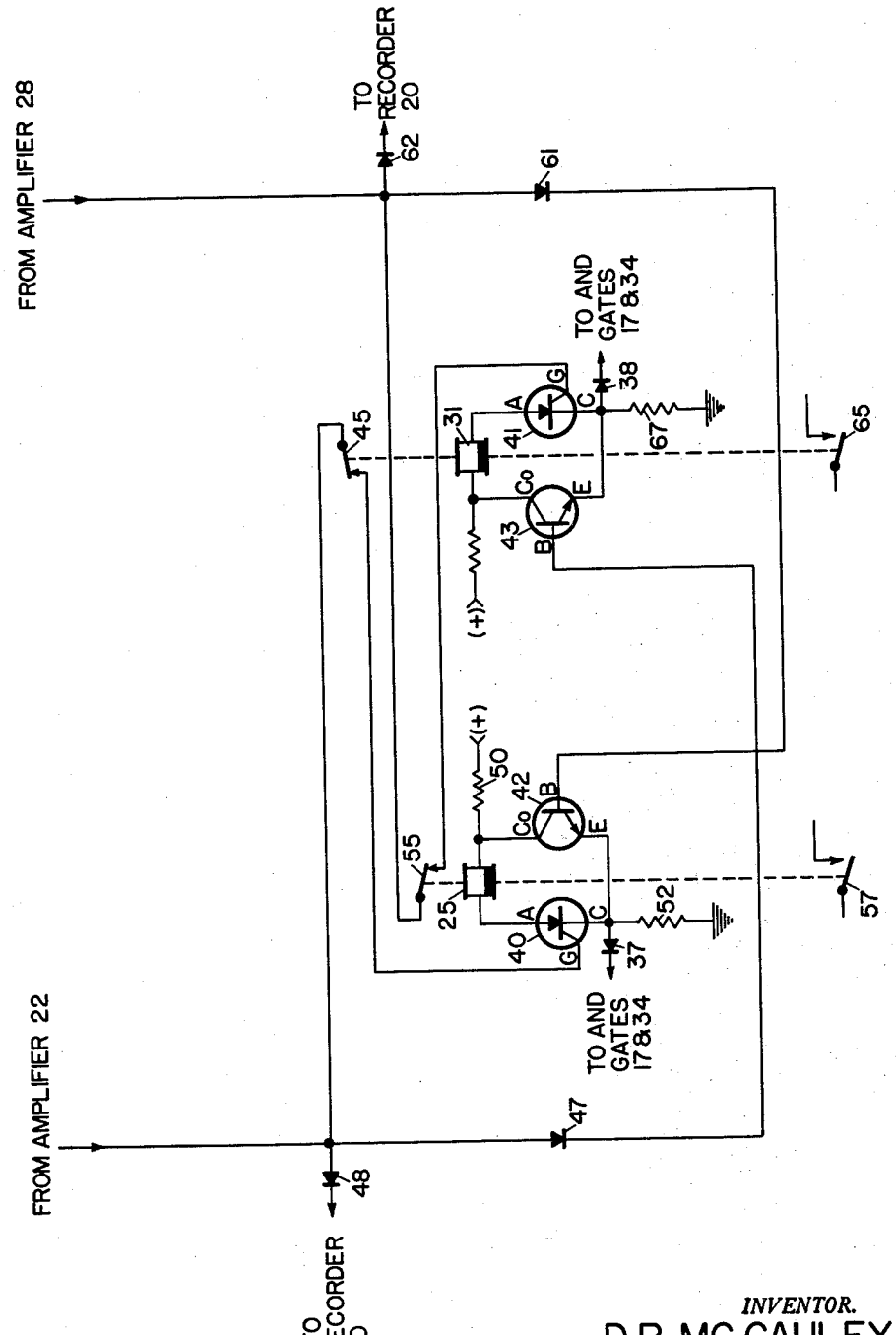
Figure 3:
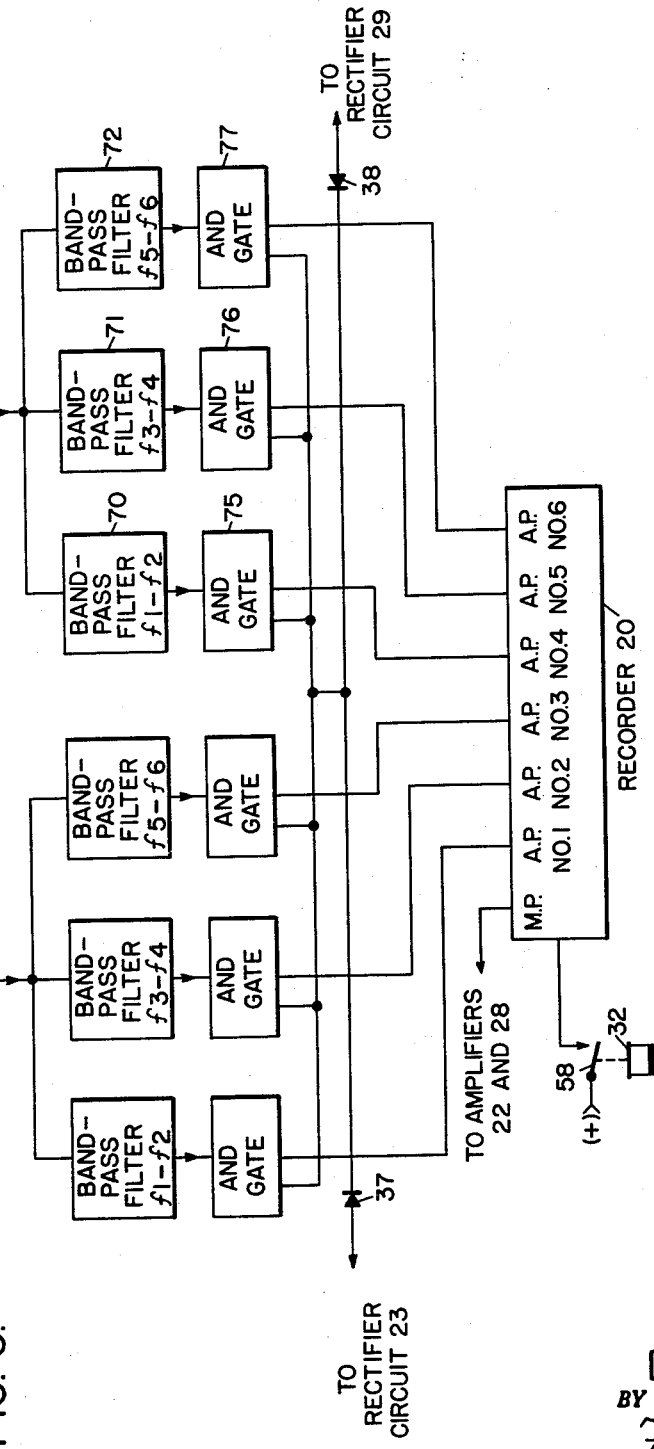

In describing the invention in detail, reference will be made to the accompanying drawings, in which like reference characters designate corresponding parts throughout the several views, and in which:

FIG. 1 illustrates the embodiment of this invention;

FIG. 2 diagrammatically illustrates detailed circuits for a portion of the embodiment shown in FIG. 1; and FIG. 3 illustrates in a more detailed manner another portion of the embodiment shown in FIG. 1.

For the purpose of simplifying the illustrations and facilitating in the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in a conventional manner, and the symbols (+) and (—) are employed to indicate connections to the terminals of batteries or other sources of electric current, instead of showing all of the wiring connections to these terminals. Moreover, certain conventional electronics circuits, well-known in the art, have been shown in block diagram form rather than by showing the detailed circuitry thereof.

Before proceeding with the description of this invention, it is considered expedient to first review the phenomenon mentioned above with respect to this invention.

In the construction of each railway car, and more particularly with respect to each wheel thereof, it is the well-known common practice to include a journal which is connected to the associated wheel by a portion of an axle while each journal also has a bearing associated therewith. The bearing and journal are included in a journal box. In order to provide lubrication between contacting surfaces of the bearing and journal, the bottom portion of the journal box is filled with a waste material which is normally saturated with oil. The desired lubrication is then effected when the bottom surface of the journal is made to rub against the saturated waste material.

Under normal conditions, i.e., when the waste material is sufficiently saturated with oil, suitable lubrication is provided between the bearing and journal such that the friction therebetween is small and any deflections of the axle which may result are extremely small and of little consequence. On the other hand, should the waste material be insufficiently saturated because of a decreased quantity of oil, insufficient oil is transferred to the bottom surface of the journal which causes the friction between the journal and bearing to increase appreciably. This results in the heating of the journal and bearing and this heat is transferred also to the waste material, causing the waste lubricant to be further dissipated. If this condition is allowed to continue, temperatures of a high degree are reached as a result of the high friction such that the waste material will commence to burn in addition to an eventual breakage of the axle as caused by the repeated stresses thereon.

Irrespective of the lubrication conditions, friction occurring between the journal and bearing results in a series of seizures and releases therebetween. Each of these seizures stops the rotation of the journal momentarily until torsional force is built up by deflection in the axle. The restraining force producing this deflection is eventually overcome, however, by the unlimited torque normally exerted on the journal. At such time, the journal springs back to its undeflected state; however, constantly effective restraining force exerted by friction on the end of the axle immediately causes torsional deflection to recur. Thus, the rotation of the axle in a journal may be characterized as a succession of minute torsional deflections, each being followed by a springing back of the shaft to its original, nondeflected condition. The momentary force built up to produce a minute deflection in the axle and its attendant release causes an impule to be transmitted back to the rail via the wheel. Inasmuch as these impulses are repeated at regular intervals, vibration is constantly being generated in the rail with the frequency and amplitude thereof being characteristic of bearing conditions.

The foregoing has been with respect to improper lubrication of a journal. Vibrations may be established in the rail in the manner described by other conditions occurring during operation of the journal. For example, a portion of the waste material may become dislocated from the main portion and find itself eventually between the surfaces of the journal and bearing. Under these conditions, the effectiveness of the lubrication between the journal and bearing would be diminished even though a proper quantity of lubrication or oil is present in the journal box. The presence of the waste material between the journal and bearing then causes vibrations to be established in the rail which have a frequency distinctive from those vibrations established under different conditions.

The exact frequency of the vibrations with respect to different conditions of an operating journal that is transmitted to the rail will vary over a fairly substantial range. For example, a heavily loaded car resulting in a high bearing pressure, a high coefficient of friction between the rubbing surfaces and a low relative velocity of the rubbing surfaces will all tend to lower the frequency at which vibrations occur. Conversely, the opposite condition will, of course, increase the frequency of such vibration. Irrespective of the conditions, however, as the friction between the rubbing surfaces of the bearing and journal is increased due to lack of lubrication or interfering waste material, the seizures therebetween tend to occur more frequently, thus increasing the frequency at which impulses are transmitted to the rail which causes the vibrations established therein to be at higher and higher frequencies.

The above reasons presented as to the origin of the impulses transmitted to the rail as an axle having improper lubrication or interfering waste material rotates in its associated journal are offered only as one possible theory. Also, the statement made above in regard to the frequency at which the vibrations occur as the seizures of the bearing and journal become more predominant is presented as a possible theory. Additional or even different factors may be instrumental in the development of seizures between the bearing and journal and the effect thereof on the frequency of vibration of the impulses transmitted to the rail without affecting the utility of the apparatus of this invention in detecting the vibration in the rail and thereby determining that at least one undesirable condition, i.e., improper journal lubrication or interfering waste material, exists.

With reference to FIG. 1, the transducer means employed to convert the vibrations transmitted to the rail from a journal operating under different conditions to electrical output signals must have relatively broad frequency response characteristics in the frequency range at which these vibrations occur. Of course, the transducer means should preferably be less responsive to frequencies outside of the desired frequency range so as to contribute thereby to improving the signal-to-noise ratio. One means which may be effectively employed to accomplish this conversion is, for example, a transducer device well known in the art and commonly referred to as an accelerometer which may be affixed to the rail in a manner to convert the vibrations present in the rail, which may be in the form of longitudinal waves, into electrical output signals.

Referring now to FIG. 1, the present invention is illustrated with respect to rails 10 and 11 which are presumed to be included in a railroad track over which trains of the usual types normally travel. Transducers T1 and T2 are shown as being positioned contiguously to respective rails 10 and 11, and each of the transducers T1 and T2 is provided for converting the vibrations established in respective rails 10 and 11 transmitted from an operating journal within the area demarcated by wheel detectors WD1 and WD2 into electrical output signals.

Each of the transducers T1 and T2 has an amplifier, band-pass filter and an AND gate associated therewith provided for the respective purposes of amplifying the electrical output signals, acting upon those signals having a frequency within the predetermined frequency range, and passing the amplified signals to a recorder according to the presence of a wheel within the area demarcated by wheel detectors WD1 and WD2. For example, transducer T1 has amplifier 15, band-pass filter 16 and AND gate 17 associated therewith. Each of these circuits is assumed to be of conventional form similar to that shown in the prior art and operated in like manner. In this connection, each of the band-pass filters 16 and 19 is effective to act to discriminate against frequencies not within the predetermined frequency range, thereby improving the signal-to-noise ratio of the system. Each of the AND gates 17 and 34 is of the type which requires two inputs simultaneously for a given time in order to provide an output for the duration of that time.

Each of the outputs derived from the respective AND gates 17 and 34 associated with transducers T1 and T2 are supplied to analog pens in a recorder 20 of a type well known in the art. For example, outputs derived from AND gate 17 are supplied to analog pen No. 2 included in the recorder 20. Before the outputs can be derived from respective AND gates 17 and 34, a second input must be supplied thereto, and these inputs are provided according to the operation of the wheel detectors WD1 and WD2.

Each of the wheel detectors WD1 and WD2 is of the type which when affixed to a rail is adapted to provide an output according to a passing wheel coming into an inductive coupling relationship therewith. It will be noted that wheel detectors WD1 and WD2 are shown in relation with rail 10 in FIG. 1. It should be understood, however, that either wheel detector WD1 or wheel detector WD2 could be located in relation to rail 11, or even both wheel detectors WD1 or WD2 could be located in relation to rail 11; in each instance, suitable outputs would be effected by each wheel detector as each passing wheel travels thereover. Irrespective of the relationship with rails 10 and 11, the distance between wheel detectors WD1 and WD2 in relation to a passing wheel should be in the order of eighteen inches.

Each of the wheel detectors WD1 and WD2 has an amplifier, rectifier circuit, rectifier control circuit and a relay associated therewith. More particularly, wheel detector WD1 has amplifier 22, rectifier circuit 23, rectifier control circuit 24 and a relay 25, while wheel detector WD2 has amplifier 28, rectifier circuit 29, rectifier control circuit 30 and relay 31 associated therewith. The purpose of each of the rectifier circuits 23 and 29 is to provide that respective relays 25 and 31 are maintained energized according to an amplified pulse received from respective amplifiers 22 and 28 according to a wheel passing over respective wheel detectors WD1 or WD2. In this connection, the first wheel detector effective to provide an output is adapted to control the associated rectifier circuit to an energized condition which causes the associated relay to be energized for the duration of rectifier circuit energization. In the energized condition of each of the relays, the nonassociated rectifier circuit is disconnected from its associated amplifier. Also, another circuit organization including a relay 32 is operated which is effective to provide driving energy for the recorder 20.

Each of the rectifier control circuits 24 and 30 is provided for controlling respective rectifier circuits 23 and 29 to a deenergized condition according to a wheel passing over the opposite wheel detector. During the energized condition of respective rectifier circuits 23 and 29, a positive-going gating voltage is supplied to AND gates 17 and 34 associated with transducers T1 and T2. When the associated rectifier control circuit 24 and 30 is effectively energized, however, the respective rectifier circuit 23 or rectifier circuit 29 is controlled to a deenergized condition which causes the positive-going gating voltage to cease. The positive-going gating voltage is shown to be supplied from the rectifier circuits 23 and 29 to the AND gates 17 and 34 through respective diodes 37 and 38. Diodes 37 and 38 are provided here in order to interrupt any interaction between the respective circuits which could occur and to provide positive action thereof.

Referring to FIG. 2, detailed circuits are shown therein for the rectifier circuits 23 and 29 and the rectifier control circuits 24 and 30 and the manner in which they are employed to control the respective relays 25 and 31. More particularly, each of the rectifier circuits 23 and 29 includes a silicon controlled rectifier having an anode A, a cathode C and a gate G, while each of the rectifier control circuits 24 and 30 includes an NPN type transistor having an emitter E, a collector CO and a base B. For example, rectifier circuit 23 includes silicon controlled rectifier 40, while rectifier control circuit 24 includes NPN type transistor 42. The relay 25 is shown to be included in the anode A circuit of silicon controlled rectifier 40, while NPN type transistor 42 effectively bypasses the silicon control rectifier 40 and relay 25 by having its emitter E connected to the cathode C of rectifier 40 and its collector CO connected to one side of the relay 25. The characteristic of the rectifier 40 is such that a positive-going gating pulse is required on gate G in order to provide conduction between the anode A and cathode C of rectifier 40. The conduction thereof remains even though the positive-going gating pulse is removed from gate G and until such time as the current flow therethrough is effectively reversed. This reversal of current flow is accomplished by causing transistor 42 to become conductive for a short interval as determined by a positive-going pulse supplied to its base B.

It is believed that the nature of the invention, its advantages and characteristic features can be best understood with further description being set forth from the standpoint of operation.

*Operation*

With reference to FIGS. 1 and 2, if it is assumed that a train is moving left to right over rails 10 and 11, the wheel detectors WD1 and WD2 are effective to provide output pulses for each wheel of the train that passes thereover and with respect to rail 10. Each wheel of the train will, however, cause wheel detector WD1 to be operated first. The circuits of FIGS. 1 and 2 are then operative in a similar manner for each of the wheels of the assumed train.

As a wheel passes over wheel detector WD1, the output drived therefrom is supplied to amplifier 22 where it is amplified and further supplied to the gate G of rectifier 40, to the base B of transistor 43, and to the marker pen MP included with recorder 20. It will be noted that the positive-going output pulse is supplied to gate G of rectifier 40 through back contact 45 of relay 31, whereas this pulse is supplied to base B of transistor 43 through diode 47 and to marker pen MP through diode 48.

The positive pulse to gate G of rectifier 40 is sufficient to cause conduction between anode A and cathode C thereof which extends from (+), through resistor 50, through the winding of relay 25, through rectifier 40 from anode A to cathode C, through resistor 52, to ground. In this conducting condition of rectifier 40, relay 25 is energized and remains energized until rectifier 40 becomes nonconductive. During the energized condition of relay 25, the circuit extending from amplifier 28 to gate G of rectifier 41 which includes back contact 55 of relay 25 is disconnected. Also, an energizing circuit for relay 32 which extends from (+), through front contact 57 of relay 25, through the winding of relay 32, to (−) is established which causes relay 32 to be energized. Driving energy is then supplied to recorder 20 from a circuit extending from (+), through front contact 58 of relay 32, to the recorder 20. The conduction of rectifier 40 also causes a positive-going gating voltage to be supplied to the AND gates 17 and 34 through a rectifier 37 from the positive (+) side of resistor 52.

The positive-going gating voltage supplied to AND gates 17 and 34 will be maintained until such time as the assumed wheel passes over wheel detector WD2. When this occurs, an output pulse is derived from wheel detector WD2 and is amplified by amplifier 28. The amplified positive-going pulse is then supplied to the base B of transistor 42 through a diode 61 and to the marker pen MP included with recorder 20 through a diode 62. The positive-going pulse present on the base B of transistor 42 is effective to cause transistor 42 to conduct from its collector CO to its emitter E through the circuit extending from (+), through resistor 50, through transistor 42 from collector CO to emitter E, through resistor 52, to ground. This is effective to cause a reversed current to flow in rectifier 40 which causes the deenergization thereof. The current flow through the winding of relay 25 subsequently ceases which causes relay 25 to be deenergized according to its slow release characteristics. In this connection, it is assumed that the relay 25 will not become fully deenergized until the positive-going pulse supplied by amplifier 28 has been extinguished. This is to prevent rectifier 41 from being placed in a conductive state erroneously.

For each wheel of the assumed train, the rectifier 40 will be effectively operated between its conductive and nonconductive conditions so as to energize and deenergize relay 25, while rectifier 41 and relay 31 will remain in their deenergized conditions at all times. It will be noted that transistor 43 is placed in a conductive condition as each wheel passes over wheel detector WD1, but this has no effect upon rectifier 41 and relay 31 inasmuch as they are already in a deenergized condition. Also, the pulses supplied to the marker pen MP in the recorder 20 are effective to delineate the time during which analog pens Nos. 1 and 2 are operated according to vibrations established in rails 10 and 11 by respective wheels and converted by transducers T1 and T2.

If it is assumed that the train is traveling from right to left over rails 10 and 11, the wheels of the train would operate wheel detectors WD1 and WD2 in the reverse order. That is, wheel detector WD2 will be operated first with wheel detector WD1 being operated second. With this sequence of operation for wheel detectors WD1 and WD2, the silicon control rectifier 41 and relay 31 are effectively operated between their two conditions in the manner described above for rectifier 40 and relay 25.

Also, transistor 43 is effective according to the operation of wheel detector WD1 to control rectifier 41 to a nonconductive condition. During the energized condition of relay 31 for each wheel of the train, the energizing circuit for relay 32 extends from (+), through front contact 65 of relay 31, to the winding of relay 32, to (—). The positive-going gating voltage supplied to the AND gates 17 and 34 through diode 38 is taken from the positive (+) side of resistor 67.

*Modification*

The foregoing has been described with reference to the employment of one band-pass filter for each of the transducers T1 and T2, i.e., band-pass filter 16 for transducer T1 and band-pass filter 19 for transducer T2. In each case, the band-pass filter acts to pass signals having frequencies within a predetermined frequency range which are intended to be characteristic of improperly lubricated journals. As an alternate, a plurality of band-pass filters may be employed with each of the transducers T1 and T2 which are separately effective to act upon signals having frequencies in different predetermined frequency ranges which are characteristic of several conditions of journal operation.

Referring to FIG. 3, the signal outputs from respective amplifiers 15 and 18 are shown as being supplied to three band-pass filters which are indicated to have separate predetermined frequency ranges. For example, the output pulses from amplifier 15 are supplied to band-pass filters 70, 71 and 72 which respectively have predetermined frequency ranges as indicated. These frequency ranges for filters 70, 71 and 72 extend respectively from $f1-f2$, $f3-f4$, and $f5-f6$. The frequency range $f1-f2$ may, for example, be characteristic of a normally operating journal, while the frequency range $f3-f4$ may be characteristic of a journal operating without proper lubrication, and the frequency range $f5-f6$ may be characteristic of a journal operating under the condition where interfering waste material is present between the journal and bearing.

The outputs from respective filters 70, 71 and 72 are supplied to analog pens Nos. 4, 5 and 6 included with recorder 20 through AND gates 75, 76 and 77. Similarly, filers associated with amplifier 18 have their output signals supplied to pens Nos. 1, 2 and 3 for providing respective indications. The operation of the respective AND gates is similar to that described above.

Having described detection means for improperly lubricated journals on moving railway cars with a means for detecting different conditions of journal operation, as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

In a system for detecting improperly lubricated journals of railway car wheels on a passing train characterized by mechanical motions produced by the journal and bearing of the car wheel and coupled to the corresponding rail of a length of track through that car wheel, transducer means affixed to each rail of said length of track and acted on by the mechanical motions occurring in the corresponding rail to produce an electrical signal output characteristic thereof, a pair of wheel-actuated means each responsive to a car wheel travelling thereover for providing an output, one wheel-actuated means disposed on each side of said transducer means along one rail and spaced a distance apart less than the predetermined diameter of a car wheel, recording means responsive to each electrical signal produced by said tranducer means for providing an indication for the corresponding car wheel having an improperly lubricated journal, and gating means responsive to the output from a first of said pair of wheel-actuated means upon passage of a car wheel thereover for coupling control energy to said recording means to set such recording means into operation and further responsive to the output from a second of said pair of wheel-actuated means upon passage of that car wheel thereover for decoupling said control energy from said recording means to thereby stop operation of said recording means.

References Cited in the file of this patent
UNITED STATES PATENTS

| | | |
|---|---|---|
| 1,690,279 | Craft | Nov. 6, 1928 |
| 2,061,753 | Bone | Nov. 24, 1936 |
| 2,337,414 | Rieber | Dec. 21, 1943 |
| 2,633,205 | Rayder | Mar. 31, 1953 |
| 2,677,047 | Mishelevich | Apr. 27, 1954 |
| 2,829,267 | Howell | Apr. 1, 1958 |
| 2,856,539 | Orthuber et al. | Oct. 14, 1958 |
| 2,880,309 | Gallagher et al. | Mar. 31, 1959 |
| 2,900,039 | Burnett | Aug. 18, 1959 |
| 3,016,457 | Brown et al. | Jan. 9, 1962 |
| 3,028,484 | Gallagher | Apr. 3, 1962 |
| 3,079,497 | Remz et al. | Feb. 26, 1963 |